United States Patent
Bachmann et al.

(10) Patent No.: US 7,513,271 B2
(45) Date of Patent: Apr. 7, 2009

(54) FLUID INLET DEVICE FOR AN APPARATUS

(75) Inventors: Christian Gottlieb Bachmann, Ellikon an der Thur (CH); Pierre Schaeffer, Winterthur (CH); Felix Muggli, Neftenbach (CH)

(73) Assignee: Sulzer Chemtech AG, Winterthur (CH)

( * ) Notice: Subject to any disclaimer, the term of this patent is extended or adjusted under 35 U.S.C. 154(b) by 147 days.

(21) Appl. No.: 11/801,370

(22) Filed: May 9, 2007

(65) Prior Publication Data

US 2007/0261743 A1    Nov. 15, 2007

(30) Foreign Application Priority Data

May 12, 2006    (EP)    .................................. 06405203

(51) Int. Cl.
*F17D 1/00*    (2006.01)
*F02M 29/04*    (2006.01)

(52) U.S. Cl. .................................... 137/592; 261/114.3

(58) Field of Classification Search ................. 137/592, 137/561 A, 561 R; 261/114.3; 366/336, 366/175.2; 454/277, 299, 309; 55/440, 447; 95/269

See application file for complete search history.

(56) References Cited

U.S. PATENT DOCUMENTS 4,315,815 A * 2/1982 Gearhart ..................... 208/321
5,516,465 A * 5/1996 Yeoman ..................... 261/79.2
7,350,962 B2 * 4/2008 Kao et al. ................. 366/165.2
2003/0029778 A1 * 2/2003 Vedrine ....................... 208/347
2005/0236048 A1 * 10/2005 Griepsma et al. ........... 137/592

FOREIGN PATENT DOCUMENTS

| DE | 15 19 711 A1 | 7/1970 |
| EP | 1018360 | 7/2000 |
| EP | 1018360 A1 * | 7/2000 |
| EP | 1279428 | 1/2003 |
| EP | 1279428 A1 * | 1/2003 |
| WO | WO 03/070348 | 8/2003 |

* cited by examiner

*Primary Examiner*—Stephen M Hepperle
*Assistant Examiner*—Atif H Chaudry
(74) *Attorney, Agent, or Firm*—Francis C. Hand; Carella, Byrne, Bain et al.

(57) ABSTRACT

The fluid inlet device for a column includes an inflow stub and a deflection unit. The deflection unit includes an input zone with a plurality of inlet passages of constant cross-sections that merge into diffuser-like passages formed by curved guide lamellae. The curved guide lamellae diffuse the flow of fluid from the lateral passages laterally and circumferentially of the column to separate a high density phase, such as liquid drops, from a low density phase, such as a gas, under centrifugal force. The curved lamellae also direct the flow of fluid from the central passages downwardly of the column.

12 Claims, 3 Drawing Sheets

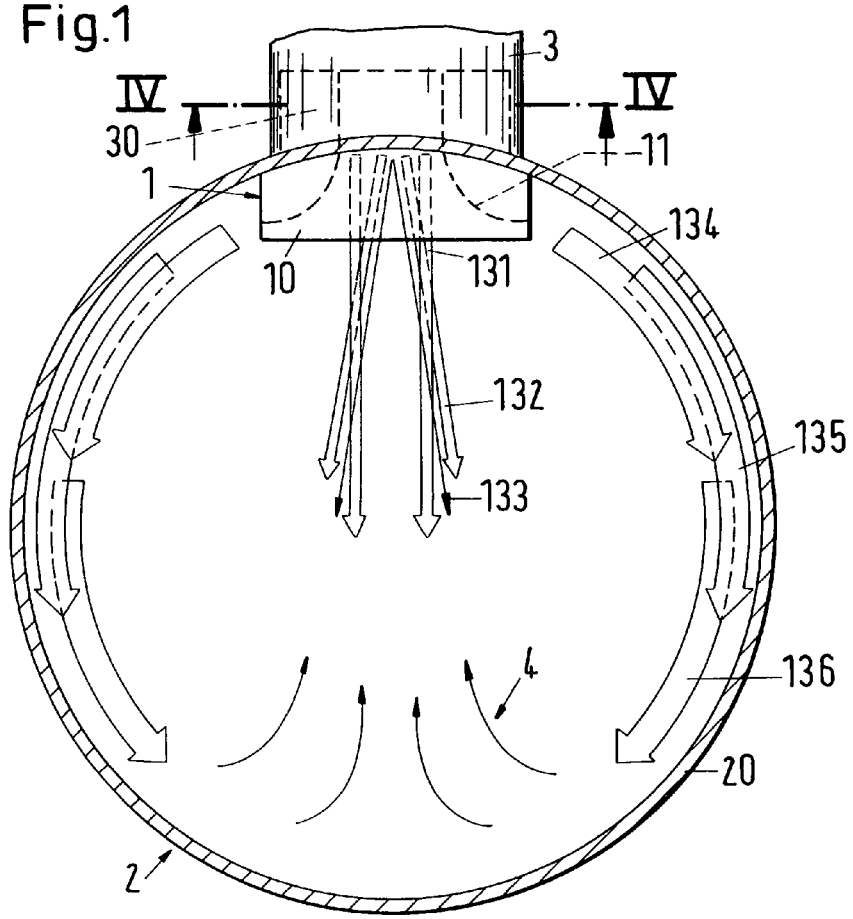
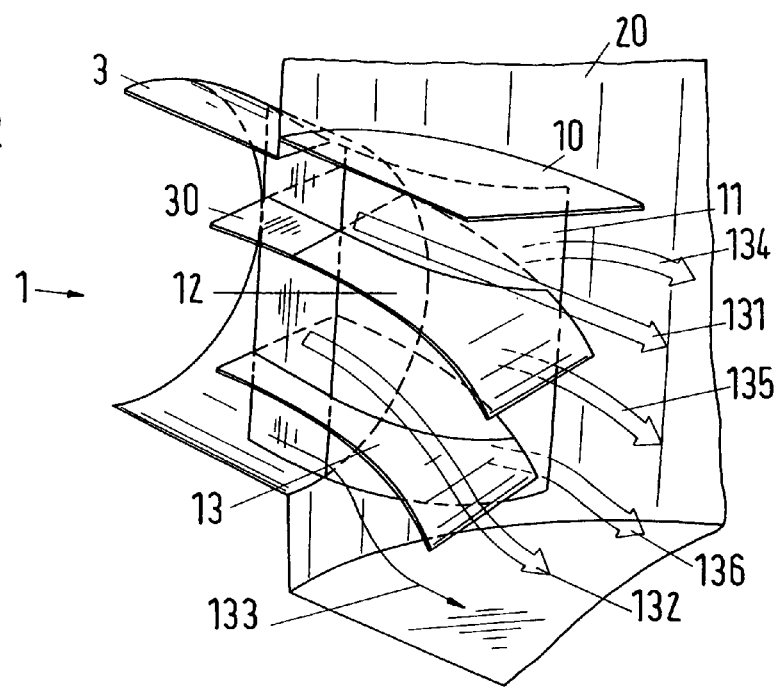

FLUID INLET DEVICE FOR AN APPARATUS

This invention relates to a fluid inlet device for an apparatus, in particular for a column.

A fluid inlet device for a column is known from DE-A-1 519 711, namely an inlet and distribution device, for a liquid/vapor mixture, with which such a two-phase fluid can be fed into the column, wherein the liquid carried along in the fluid (in the form of liquid droplets) can simultaneously be precipitated. In this connection, the inflowing fluid is branched into part flows by a plurality of curved guide lamellae or guides, and each part flow is diverted such that the denser phase can be precipitated at least partly while using centrifugal forces. The vapor is distributed over the cross-section of the apparatus, whereas liquid is precipitated. This known fluid inlet device can naturally also be utilised for the feeding in of a single-phase fluid (liquid or gas). The inlet device yields a uniform flow to a lower inflow to a pack, for example, which is located spaced apart over the fluid inlet device. Other installations can also be provided in the apparatus or in the column instead of the pack, for example a device for the separation of liquid droplets carried along, which were not intercepted in the fluid inlet device. The fluid inlet device consists of a relatively complex sheet metal construction.

A further and substantially simpler fluid inlet device is known from EP-A-1 018 360, which is formed by a relatively small deflection unit for the fluid fed into a column. The fluid inlet device requires less material and is simpler to manufacture. However, the simplest embodiment of this fluid inlet device is not suited to also precipitate liquid simultaneously with the gas distribution in a two-phase fluid. Two lateral part flows are formed in the deflection unit which largely flow in specular (i.e. mirror image) symmetry along an inner wall of the column and subsequently form a back flow after a reunification, whose horizontal velocity component is directed radially and towards the fluid inlet device. At least one third, central part flow is formed by means of the deflection unit, which is directed radially and oppositely with respect to the back flow of the reunified part flows. The third part flow is made so powerful that the back flow is largely prevented from streaming through the column center. A central and two lateral branch flows can thus be produced by the deflection unit, which effects a calming of flow, with a flow shape arising which results in a uniform velocity distribution under the pack. The gas flow develops freely after exiting the deflection unit and does not have to be diverted using a complex sheet metal construction.

The object of the invention is to provide a further fluid inlet device which is a deflection unit which is as simple as possible for a gas flow containing liquid with which a gas distribution and separation of at least some of the liquid can be carried out simultaneously.

Briefly, the invention provides a fluid inlet device for delivering a flow of fluid to an apparatus, such as a vertically disposed column for distribution and separation out of a higher density phase.

The fluid inlet device includes an inflow stub and a deflection unit adjoining the stub downstream with curved guide lamellae. Central and lateral part flows can be produced by the deflection unit from a fed in fluid flow and effect a slowing of flow by interaction in a central area of the apparatus.

The deflection unit includes an input zone having a plurality of inlet passages in which the passage cross-sections remain constant. This input zone can be at least partly located in the inflow stub. The inlet passages merge into passages which are diffuser-like and formed with the curved guide lamellae. At least two stories with at least one central passage and two lateral passages each are present. The part flows of the second and, optionally, third story arranged further below, can be diverted downwardly by curved guide lamellae.

Model calculations (CFD simulations) confirm that the device according to the invention having diversion metal sheets (i.e. lamellae) which form the diffuser-type flow passages (albeit passages with a relatively large opening angle) results in a uniform velocity distribution at the pack. Experiments show that the separation of a liquid located in the gas flow is relatively good, namely practically as good as with the more complex fluid inlet device, which is disclosed by the above-cited DE-A-1 519 711.

These and other objects and advantages of the invention will become more apparent from the following detailed description taken in conjunction with the accompanying drawings wherein:

FIG. 1 illustrates a cross-sectional view through a column with a fluid inlet device according to the invention and indicates the, part fluid flows formed by the fluid inlet device;

FIG. 2 illustrates a perspective view of one-half of the fluid inlet device of FIG. 1 with a schematic representation of the part flows;

Referring to FIG. 1, an apparatus, in particular a vertically disposed column 2 is provided with a fluid inlet device for the delivery of a fluid which may be single phase or multiphase into the interior of the column 2.

Figure 3:
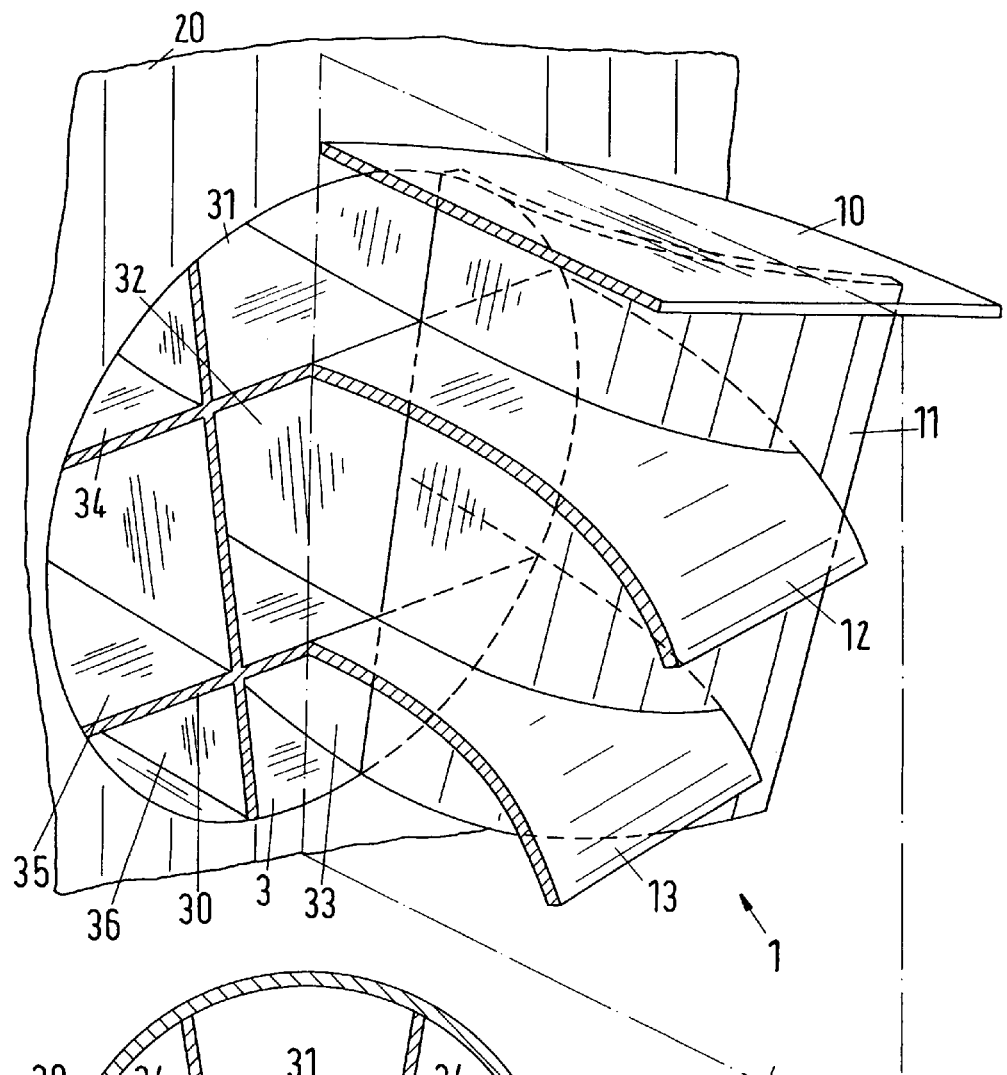
FIG. 3 illustrates a perspective view of the fluid inlet device in more detail.
Figure 4:
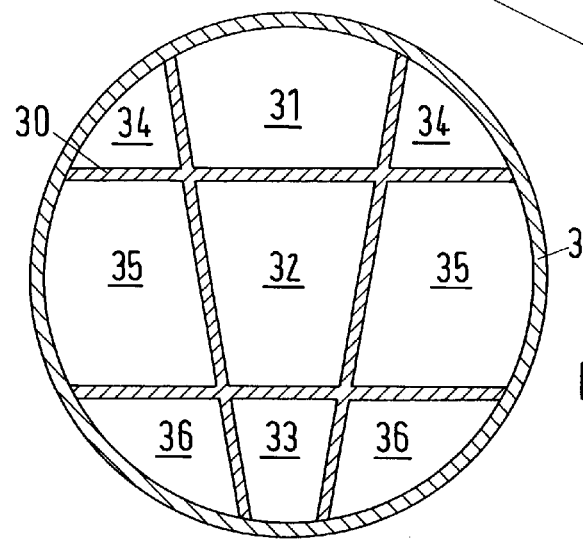
FIG. 4 illustrates a cross-section through the inflow stub of the column taken on line IV-IV of FIG. 1 showing a preferred passage configuration.

Referring to FIGS. 2 and 3, the fluid inlet device includes an inflow stub 3 that has a grid 30 of smooth walls defining three stories of inlet passages 31-36 of constant cross-section. As indicated, each story includes a central passage 31, 32, 33 and a pair of lateral passages 34, 35, 36. Also, each of the central inlet passages 31, 32, 33 has a cross-sectional shape that converges from top to bottom.

The fluid inlet device also has a deflection unit 1 adjoining a downstream side of the inflow stub 3 to receive and disperse the flow of fluid into the column 2. This deflection unit 1 includes a plurality of curved guide lamellae 11, 12, 13 that extend from the walls of the grid 30 into the column 2 to form diffuser-like passages for diffusing the flow of fluid from the lateral passages 84, 35, 36 laterally and circumferentially of the column 2 and the flow of fluid from the central passages 31, 32, 33 downwardly of the column 2.

A fluid is fed into the column 2 via the stub 3, is guided on curved tracks by the guide lamellae 11, 12, 13 and is distributed over the cross-section of the column 2 after exiting the deflection unit 1. A disperse phase; of high density can be at least partly precipitated through use of its inertia (for example centrifugal force) in the deflection unit 1 in the case of a two-phase fluid.

The grid 30 in the inflow stub 3 can be very short or even be entirely omitted. However, a corresponding grid-type entry zone must be provided in the deflection unit 1, in which the cross-sections of the passages remain constant. This entry zone can be arranged at least partly in the inflow stub. The passage walls are formed by curved areas of the guide lamellae 11, 12, 13 after the entry zone.

In the embodiment shown, the inflow passages 31, 32, . . . 36, which form the entry zone arranged in the inflow stub 3 and which each have a constant cross-sectional surface, merge into diffuser-like passages of the deflection unit 1 formed by the curved guide lamellae 11, 12, 13 and the column wall 20. Due to the diffuser-like shape, kinetic energy of the flow is converted into an increase of static pressure so that a loss of pressure is reduced. The inflow passages 31, 32 . . . 36 and the diffuser-like passage sections following downstream are formed so that a pressure loss in the inflowing fluid turns out to be minimal or largely minimal.

As indicated in FIGS. 1 and 2, central part flows 131, 132, 133 and lateral part flows 134, 135, 136 are produced by the deflection unit 1 from the fed-in fluid flow. The lateral part flows 134, 135, 136, which flow in specular symmetry (i.e. mirror image symmetry) along the wall 20, subsequently form a flow field 4 after a reunification in which the horizontal velocity components of the back flowing gas are largely directed radially and towards the deflection unit 1. A calming of flow results from an interaction with the central part flows 131, 132, 133 in the central area of the apparatus.

The grid 30 and accordingly the deflection unit 1 comprise stories, each with a central passage 31, 32 and 33, and lateral passages 34, 35 and 36, which are present in pairs and in specular symmetry. There are, at least two stories. There are three stories, each with three passages in the embodiment shown in FIGS. 1 to 4. The cross-sectional surfaces as a rule have differently sized cross-sectional surfaces. The specular axis of the passage configuration can lie on a central wall of the grid 30 in contrast to what is shown. In this case, the stories have two central passages each.

The curved lamellae 11, with which the lateral part flows 134, 135, 136 are diverted towards the column wall 20 in the deflection unit 1, separate the central passages 31, 32, 33 from the lateral passages 34, 35, 36. The part flows 132, 133, 135 and 136 of the second and third stories arranged further below, are diverted downwardly by the curved guide lamellae 12, 13 (see FIG. 2). The gas distribution is improved noticeably by these downwardly directed deflections with respect to the deflection unit known from EP-A-1 018 360.

FIG. 3 shows, somewhat more clearly than FIG. 2, the fluid inlet device which consists of a part section of the inflow stub 3, the grid 30 and the deflection unit 1. Only half of the deflection unit 1 is shown, which is located behind a vertical plane 21 lying on a central axis of the apparatus 2. The front half is formed in specular symmetry to the rear. The grid 30 and the deflection unit 1 can be formed as separate parts or as a combined construction. The inflow passages 31-36, whose number advantageously amounts to nine, enable different flow resistances to arise for the fluid flowing through these passages. This procedure results in a beneficial formation of the part flows for the gas distribution. The cross-sectional surfaces of the inflow stubs 31-36 can therefore be of different sizes. Optimal cross-sectional surfaces may be determined empirically by measurements or numerically by means of computer models. A variation coefficient ($K_p = \sqrt{\int (w/w_m - 1)^2 \, dA / \int dA}$) is calculated !for the distribution of the vertical velocity components ($w$; mean $w_m$) on a given horizontal cross-section through the flow, for example at the lower entry to the pack. This variation coefficient has a minimal value if an optimal flow exists.

The deflection unit 1 can also be made asymmetrical and indeed with an asymmetry which is formed with respect to a flow of the fed fluid, which flows asymmetrically. An asymmetric flow exists, for example, if a manifold is arranged upstream in front of the inflow stub 3.

The deflection unit 1 and the grid 30 can be designed as sheet metal constructions. The deflection unit 1 can be manufactured from two metal sheets 12, 13, whose areas at the entry side are horizontal and whose areas at the exit side are bent downwardly in the manner of tongues as well as from two metal sheets 11, which are curved in an arcuate shape about an approximately vertical axis.

The construction of the four metal sheets 11, 12, 13 is covered by a roof. The uppermost passages are covered by w all pieces 10, which are aligned horizontally in the direction of the uppermost central part flow 131. The covering wall pieces 10 can also be downwardly curved in the direction of the flow. The passages of the deflection unit 1 have variable cross-sections due to the bent plates 11, 12, 13, which extend in diffuser-like shape in the direction of the flow.

The wall pieces 10 can be formed contiguously and, for example, in the form of an arcuate-like sheet metal piece. The metal sheets 12 and 13 can be made up of two part surfaces, which are each adjacent to one another on the plane 21 (FIG. 3) and thereby form a plough-like V-shape, whose curved crest or fold lies on the vertical symmetry plane 21. The two part surfaces which are downwardly curved to the side of the crest, guide the flow partially out of the center to the sides of the apparatus.

The inflow passages, each having a constant cross-sectional surface differ in the embodiment shown in the following way (FIG. 4): the horizontal widths of the central inflow passages converge from top to bottom, and the inflow passages of the central storey feature the largest cross-sectional surfaces. Configurations with other dimensions are also possible, for example such in which no convergence is present.

Figure 5:
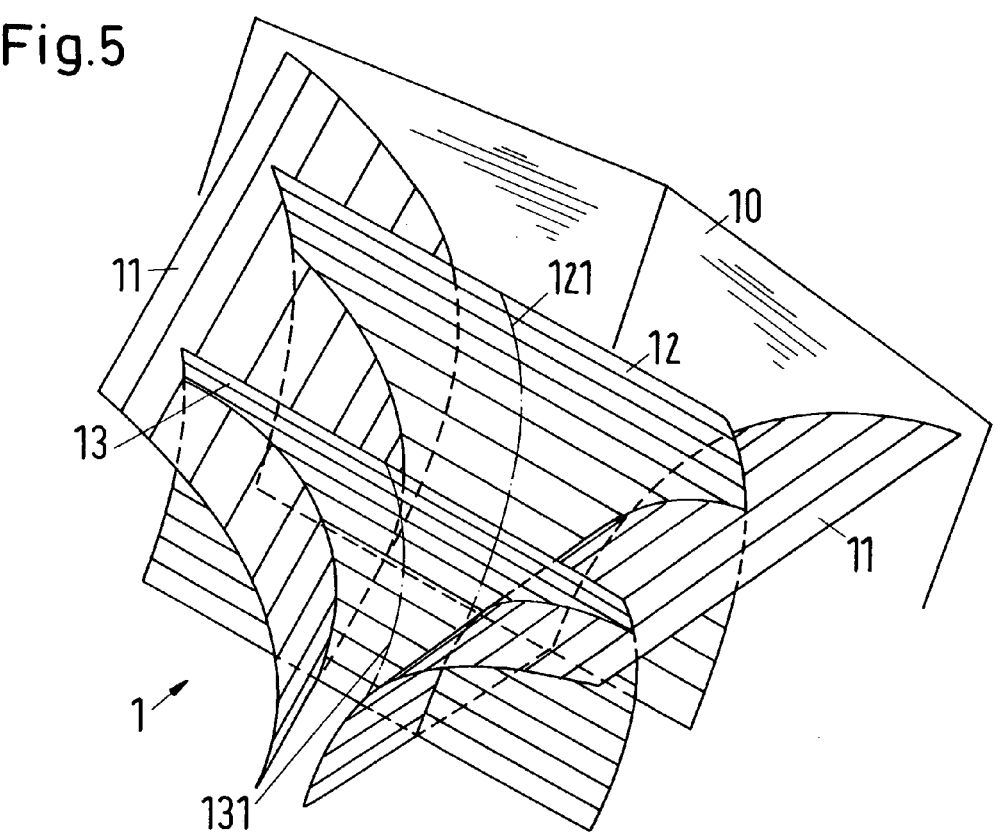
FIG. 5 illustrates a deflection unit of the fluid inlet device which is shown from a position beneath the deflection unit.

FIG. 5 shows an alternative deflection unit 1 of the fluid inlet device 1, which is shown from a position beneath the deflection device 1 (from a "worm's eye" view). On the concave surfaces, i.e. the visible, lower surfaces of the lamellae 12 and 13, liquid is precipitated with a two-phase fluid. (The section curves of the central plane 21, not shown here, with the lamellae 12 and 13 are indicated with chain-dotted lines 121 and 131 respectively.)

Figure 6:
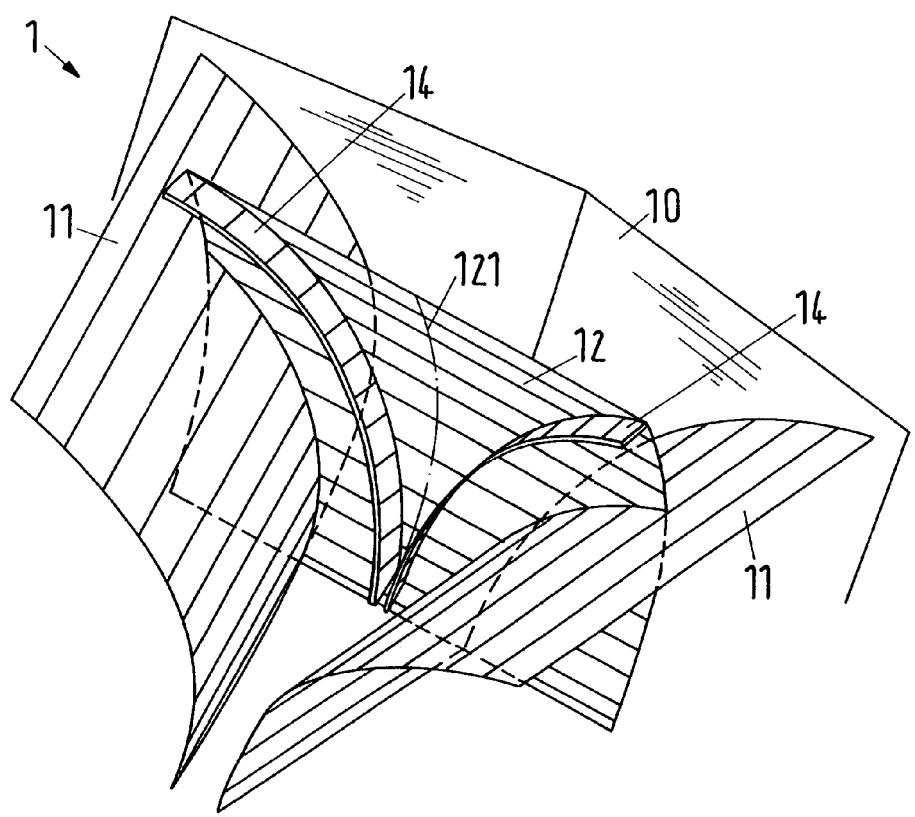
FIG. 6 illustrates a deflection unit as in FIG. 5 which includes additional elements and in which one lamella is omitted.

In FIG. 6, a deflection unit 1 as in FIG. 5 is illustrated, wherein only the lamella 12 is shown and the lamella 13 is omitted. Two additional elements 14 are arranged on the lower side of the lamella 12, which form ribs for a liquid deflection. Such liquid deflectors 14 can also be curved ribs with an L or U section, with one of the flanks of these sections lying flush on the lamella surfaces. It is likewise possible to use a half tube open against the flow. Corresponding deflectors are also advantageous on the concave, largely invisible outer side of the lateral lamellae 11. Such deflectors guide precipitate liquid downward due to a shape with a suitable curvature.

The curved guide lamellae 11, 12, 13 can additionally be formed pocket-like at margins at the outlet side so that a liquid phase precipitated at the guide lamellae can be guided away from the fed fluid flow in the pocket-like margins by outflow gaps (not shown).

The deflection unit is made symmetrical relative to the vertical plane 21 lying on the central axis of said deflection unit. The flow direction of the inlet device which is given by a central passage 31 thereby faces towards the center of the central area in front of the deflection unit 1. This part flow can also be directed to an eccentric point in the central area, for example with an asymmetrical embodiment of the fluid inlet device.

The fluid inlet device can be used to feed and distribute a fluid, which is multiphase or single phase, into an apparatus or a column 2. The fluid is in particular a gas that is loaded with a denser phase, for example liquid droplets. The fluid can also consist of only one material or of one single-phase mixture of materials. In the deflection unit 1, a dispersed phase of higher density can be precipitated at least partly, with centrifugal forces or more generally, the inertia of the dispersed phase being used for the precipitation, in the case of a two-phase fluid.

What is claimed is:

1. A fluid inlet device for a column comprising
   an inflow stub for delivering a flow of fluid into the interior of a column; and
   a deflection unit adjoining a downstream side of said stub to receive and disperse the flow of fluid into the column, said deflection unit including an input zone having at least two stories of inlet passages of constant cross-section extending at least partly into said inflow stub to convey the fluid therethrough, each said story including a central passage and a pair of lateral passages, and a plurality of curved guide lamellae extending from said input zone into the column to form diffuser-like passages for diffusing the flow of fluid from said lateral passages laterally and circumferentially of the column and the flow of fluid from said central passages downwardly of the column.

2. A fluid inlet device according to claim 1 wherein said input zone of said deflection unit includes three of said stories of inlet passages and said curved lamellae include a pair of curved lamellae separating said central passages of said three stories from said lateral passages of said three stories.

3. A fluid inlet device according to claim 1 wherein said deflection unit is made symmetrical relative to a vertical plane lying on a central axis of said deflection unit.

4. A fluid inlet device according to claim 1 further comprising at least one wall piece extending above said curved lamellae to cover over the uppermost of said passages.

5. A fluid inlet device according to claim 4 wherein said wall piece is downwardly curved.

6. A fluid inlet device according to claim 1 wherein each of said central inlet passages has a cross-sectional shape converging from top to bottom.

7. A fluid inlet device according to claim 1 further comprising at least one rib-type deflector disposed on each curved guide lamellae for deflecting liquid from the fluid flow downwardly.

8. A fluid inlet device according to claim 1 wherein each curved guide lamellae is shaped at a margin thereof to define a pocket for deflecting liquid from the fluid flow downwardly.

9. In combination,
   a vertically disposed column; and
   a fluid inlet device mounted on said column for delivering a flow of fluid into the interior of a column, said fluid inlet device including an inflow stub having a grid defining at least two stories of inlet passages of constant cross-section, each said story including a central passage and a pair of lateral passages, and a deflection unit adjoining a downstream side of said stub to receive and disperse the flow of fluid into said column, said deflection unit including a plurality of curved guide lamellae extending from said grid into said column to form diffuser-like passages for diffusing the flow of fluid from said lateral passages laterally and circumferentially of said column and the flow of fluid from said central passages downwardly of said column.

10. The combination as set forth in claim 9 wherein said central passage of each said story is directed towards a central axis of said column.

11. In combination,
    a vertically disposed column; and
    a fluid inlet device mounted on said column for delivering a flow of fluid having a high density phase and a low density phase into the interior of a column, said fluid inlet device including an inflow stub having a grid defining at least two stories of inlet passages of constant cross-section, each said story including a central passage and a pair of lateral passages, and a deflection unit adjoining a downstream side of said stub to receive and disperse the flow of fluid into said column, said deflection unit including a plurality of curved guide lamellae extending from said grid into said column to form diffuser-like passages for diffusing the flow of fluid from said lateral passages laterally and circumferentially of said column to separate the high density phase from said low density phase under centrifugal force and the flow of fluid from said central passages downwardly of said column.

12. The combination of claim 11 wherein said grid defines three of said stories of inlet passages and said plurality of curved lamellae includes a pair of curved lamellae separating said central passages of said three stories from said lateral passages of said three stories.

* * * * *

UNITED STATES PATENT AND TRADEMARK OFFICE
CERTIFICATE OF CORRECTION

PATENT NO. : 7,513,271 B2  Page 1 of 1
APPLICATION NO. : 11/801370
DATED : April 7, 2009
INVENTOR(S) : Bachmann et al.

It is certified that error appears in the above-identified patent and that said Letters Patent is hereby corrected as shown below:

Column 2,   line 51 "84" should be -- 34 --;
            line 57 cancel ";";

Column 3,   line 58 cancel "!";

Column 4,   lines 9 to 10 "w all" should be -- wall --.

Signed and Sealed this

Nineteenth Day of May, 2009

JOHN DOLL
*Acting Director of the United States Patent and Trademark Office*